(12) United States Patent
Kim et al.

(10) Patent No.: US 9,923,198 B2
(45) Date of Patent: Mar. 20, 2018

(54) CATHODE ACTIVE MATERIAL, CATHODE AND LITHIUM BATTERY INCLUDING THE SAME, AND METHOD OF PREPARING THE CATHODE ACTIVE MATERIAL

(71) Applicants: Samsung Electronics Co., Ltd., Suwon-si, Gyeonggi-do (KR); SAMSUNG FINE CHEMICALS CO., LTD., Ulsan (KR); Samsung SDI Co., Ltd., ongin-si, Gyeonggi-do (KR)

(72) Inventors: Ryounghee Kim, Yongin-si (KR); Byungjin Choi, Seoul (KR); Donghan Kim, Chungcheongnam-do (KR); Jinhwan Park, Seoul (KR)

(73) Assignees: SAMSUNG ELECTRONICS CO., LTD., Gyeonggi-do (KR); SAMSUNG SDI CO., LTD., Gyeonggi-do (KR)

( * ) Notice: Subject to any disclaimer, the term of this patent is extended or adjusted under 35 U.S.C. 154(b) by 262 days.

(21) Appl. No.: 14/816,146

(22) Filed: Aug. 3, 2015

(65) Prior Publication Data
US 2016/0190557 A1     Jun. 30, 2016

(30) Foreign Application Priority Data
Dec. 30, 2014 (KR) .................. 10-2014-0194318

(51) Int. Cl.
*H01M 4/36* (2006.01)
*H01M 4/525* (2010.01)
(Continued)

(52) U.S. Cl.
CPC ........... *H01M 4/366* (2013.01); *H01M 4/485* (2013.01); *H01M 4/505* (2013.01); *H01M 4/525* (2013.01);
(Continued)

(58) Field of Classification Search
CPC ........ H01M 4/36; H01M 4/366; H01M 4/525; H01M 4/505; H01M 10/052
See application file for complete search history.

(56) References Cited

U.S. PATENT DOCUMENTS 6,270,927 B1 * 8/2001 Nakane ................. H01M 4/485
423/594.4
6,653,021 B2 11/2003 Kweon et al.
(Continued)

FOREIGN PATENT DOCUMENTS

CN    103107326 A    5/2013
EP    2744020 A1     6/2014
(Continued)

OTHER PUBLICATIONS

Mather et al., "A review of cation-ordered rock salt superstructure oxides", J. Mater. Chem., vol. 10, 2000. pp. 2219-2230.
(Continued)

*Primary Examiner* — Kenneth J Douyette
(74) *Attorney, Agent, or Firm* — Cantor Colburn LLP

(57) ABSTRACT

A cathode active material including a layered lithium metal composite oxide including a first lithium metal oxide and a second lithium metal oxide having different crystal structures, and a third lithium metal oxide which is incapable of intercalating and deintercalating lithium in a charge and discharge voltage range of about 2.0 volts to about 4.7 volts versus lithium Li/Li$^+$. Also, a cathode and a lithium battery including the cathode active material, and a method of preparing the cathode active material.

20 Claims, 9 Drawing Sheets

(51) Int. Cl.
   *H01M 10/052*    (2010.01)
   *H01M 4/505*     (2010.01)
   *H01M 4/485*     (2010.01)
   H01M 4/02        (2006.01)
   H01M 10/0525     (2010.01)

(52) U.S. Cl.
   CPC ...... *H01M 10/052* (2013.01); *H01M 10/0525* (2013.01); *H01M 2004/021* (2013.01); *H01M 2004/028* (2013.01)

(56) References Cited

U.S. PATENT DOCUMENTS

| | | | |
|---|---|---|---|
| 7,258,821 B2 | 8/2007 | Yang et al. | |
| 2003/0206852 A1 | 11/2003 | Yang et al. | |
| 2004/0202933 A1* | 10/2004 | Yamaki | C01G 3/02 429/231.1 |
| 2006/0222948 A1* | 10/2006 | Kitao | H01M 4/131 429/231.1 |
| 2009/0081529 A1 | 3/2009 | Thackeray et al. | |
| 2011/0052990 A1* | 3/2011 | Yanagida | H01M 4/485 429/223 |
| 2011/0056824 A1* | 3/2011 | Chung | C23C 14/083 204/192.1 |
| 2014/0087264 A1 | 3/2014 | Li et al. | |

FOREIGN PATENT DOCUMENTS

| | | |
|---|---|---|
| JP | 2006202702 A | 8/2006 |
| KR | 1020130055441 A | 5/2013 |

OTHER PUBLICATIONS

Raza et al., "In situ cross-linked superwetting nanofibrous membranes for ultrafast oil-water separation*", Journal of materials Chemistry A, vol. 2, 2014. pp. 10137-10145.

Teo et al., "Conductivity and dielectric studies of Li2SnO3", Ionics, vol. 18, 2012, pp. 655-665.

Wang et al., "The effect of F127 addition on the properties of PEGDA/PVdF cross-linked gel polymer electrolytes", Journal of Membrane Science, vol. 312, 2008, pp. 76-83.

Wu et al., "Robust and Adhesive Hydrogels from Cross-Linked Poly(ethylene glycol) and Silicate for Biomedical Use", Macromolecular Bioscience, vol. 13, 2013 pp. 59-66.

* cited by examiner

Co —— 10 μm

Sn —— 10 μm

Ni —— 10 μm

SL —— 10 μm

Co —— 5 μm

Sn —— 5 μm

Ni —— 5 μm

SL —— 5 μm

Co —— 10 μm

Sn —— 10 μm

Ni —— 10 μm

CP —— 10 μm

CATHODE ACTIVE MATERIAL, CATHODE AND LITHIUM BATTERY INCLUDING THE SAME, AND METHOD OF PREPARING THE CATHODE ACTIVE MATERIAL

CROSS REFERENCE TO RELATED APPLICATION

This application claims priority to and the benefit of Korean Patent Application No. 10-2014-0194318, filed on Dec. 30, 2014, in the Korean Intellectual Property Office, and all the benefits accruing therefrom under 35 U.S.C. §119, the content of which is incorporated herein in its entirety by reference.

BACKGROUND

1. Field

The present disclosure relates to a cathode active material, a cathode and a lithium battery including the same, and methods of preparing the cathode active material.

2. Description of the Related Art

Lithium batteries have been used as power sources of various portable devices and provide high energy density.

$LiCoO_2$ has been used as a cathode active material of a lithium battery. $LiCoO_2$ has excellent charge and discharge characteristics, has high electrical conductivity, and exhibits stable discharge voltage. However, the world's estimated cobalt (Co) reserves are relatively small, and Co is expensive and is toxic to the human body. $LiNiO_2$ having a layered structure, like $LiCoO_2$, has high discharge capacity, but has poor cycle characteristics and poor thermal stability and high-temperature stability.

In order to address the limitations of such cathode active materials, many attempts have been made to develop a cathode active material having improved properties.

Also, interests in a material for a cathode active material having high energy density and a long lifespan have grown as lithium batteries have recently been used as power sources for electric vehicles or power storage in addition to the applications in portable information and telecommunication (IT) devices.

Among them, interest in the development of a cathode active material having improved rate capability and capacity has gradually grown in order to provide a lithium battery having high energy density. Accordingly, there remains a need for improved cathode active material.

SUMMARY

Provided is a cathode active material having improved rate capability, initial efficiency, and initial discharge capacity.

Provided is a cathode including the cathode active material.

Provided is a lithium battery including the cathode.

Provided are methods of preparing a cathode active material having improved rate capability, initial efficiency, and initial discharge capacity.

Additional aspects will be set forth in part in the description which follows and, in part, will be apparent from the description.

According to an aspect, a cathode active material includes: a layered lithium metal composite oxide including a first lithium metal oxide and a second lithium metal oxide having different crystal structures; and a third lithium metal oxide, which is substantially incapable of intercalating and deintercalating lithium in a charge and discharge voltage range of about 2.0 volts (V) to about 4.7 V versus lithium $Li/Li^+$.

According to an aspect, a cathode includes the cathode active material.

According to an aspect, a lithium battery includes: the cathode; an anode including an anode active material; and an electrolyte disposed between the cathode and the anode.

According to an aspect, a method of preparing a cathode active material includes: adding a base to a first lithium metal oxide precursor and a second lithium metal oxide precursor having different crystal structures to form a first mixture; drying the first mixture to obtain a precursor of a layered lithium metal composite oxide; adding a lithium source and a third lithium metal oxide precursor to the precursor of the lithium metal composite oxide to form a second mixture; and heat treating the second mixture to prepare the cathode active material.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1A:
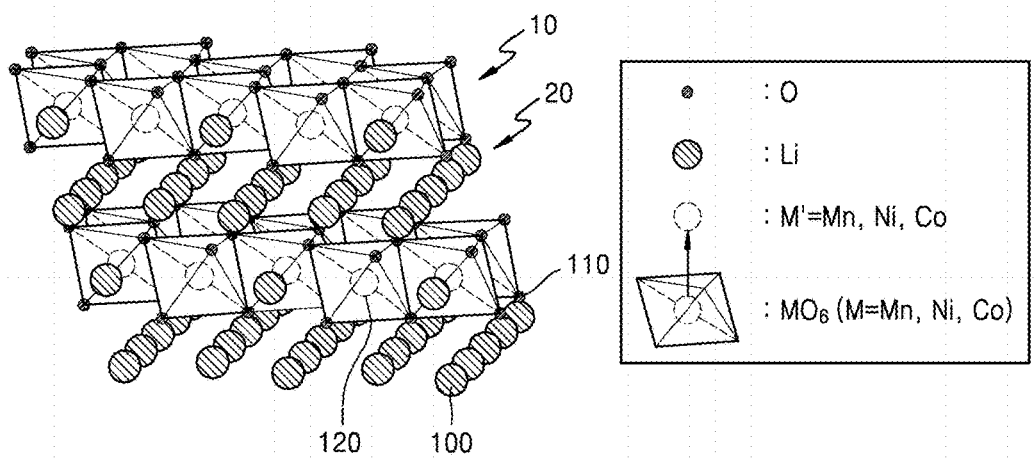
FIG. 1A is a schematic view illustrating a crystal structure of a first lithium metal oxide.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About," "approximately," or "substantially" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Layered" as used herein means that the atomic structure of the material is comprised of layers, e.g., a layer consisting of lithium and a layer comprising metal-centered oxygen octahedra, wherein the layer comprising the metal-centered oxygen octahedra may further comprise an additional element such as lithium.

"Transition metal" as defined herein refers to an element of Groups 3 to 11 of the Periodic Table of the Elements.

"Rare earth" means the fifteen lanthanide elements, i.e., atomic numbers 57 to 71, plus scandium and yttrium.

The "lanthanide elements" means the chemical elements with atomic numbers 57 to 71.

Hereinafter, a cathode active material according to an embodiment of the present disclosure, a cathode and a lithium battery including the same, and a method of preparing the cathode active material will be described in more detail. Since these are merely provided as examples, the present disclosure is not limited thereto, and the present disclosure is only defined by the scope of the following claims.

According to an aspect of the present disclosure, provided is a cathode active material which includes a layered lithium metal composite oxide that is composed of a first lithium metal oxide and a second lithium metal oxide having different crystal structures, and a third lithium metal oxide, which is substantially incapable of intercalating and deintercalating lithium in a charge and discharge voltage range of about 2.0 volts (V) to about 4.7 V vs. lithium Li/Li$^+$. In an embodiment, the third metal oxide is incapable of intercalating and deintercalating lithium in a charge and discharge voltage range of about 2.0 volts (V) to about 4.7 V vs. lithium Li/Li$^+$.

A lithium metal composite oxide comprising at least two lithium metal oxides may be used as a cathode active material to provide improved energy density and/or improved lifespan.

The layered lithium metal composite oxide may have a layered structure comprising a first lithium metal oxide and a second lithium metal oxide having different crystal structures. For example, the first lithium metal oxide may be of the formula $Li_2M^1O_3$ and the second lithium metal oxide may be of the formula $LiMe^1O_2$. The lithium metal composite oxide may have a composition of $a\text{Li}_2\text{M}^1\text{O}_3 \cdot b\text{LiMe}^1\text{O}_2$ wherein $0<a<1$, $0<b<1$, $a+b=1$, and $\text{M}^1$ and $\text{Me}^1$ are each independently an ion of a metal or metalloid.

While not wanting to be bound by theory, in the lithium metal composite oxide having a composition of $a\text{Li}_2\text{M}^1\text{O}_3 \cdot b\text{LiMe}^1\text{O}_2$ wherein $0<a<1$, $0<b<1$, $a+b=1$, $\text{M}^1$ and $\text{Me}^1$ are each independently an ion of a metal or metalloid, $\text{Li}_2\text{M}^1\text{O}_3$ contributes to structural stability of the composite and the layered $\text{LiMe}^1\text{O}_2$ has a form in which excess lithium is substituted in a metal layer or metalloid layer. Improved capacity may be obtained when the lithium metal composite oxide is charged to a minimum voltage of about 4.5 V (vs. Li/Li$^+$) or more.

While not wanting to be bound by theory, lithium is deintercalated from $\text{LiMe}^1\text{O}_2$ and maintains the composition in the lithium metal composite oxide until the charge voltage reaches about 4.4 V during initial charging, and since oxygen is generated simultaneously with the deintercalation of lithium from $\text{Li}_2\text{M}^1{}_3$, when charging at a high voltage of about 4.4 V or more, oxidation with $\text{Li}_2\text{O}$ occurs and $\text{M}^1\text{O}_2$ is generated. Also, during discharge, $\text{M}^1\text{O}_2$ does not recover to $\text{Li}_2\text{M}^1\text{O}_3$, i.e., a starting material, due to the reduction to $\text{LiM}^1\text{O}_2$. As a result, an amount of remaining $\text{Li}_2\text{M}^1\text{O}_3$, which is understood to contribute to the structural stability of the lithium metal composite oxide, is reduced during a charge and discharge process at a voltage of about 4.4 V or more.

However, with respect to the $\text{Li}_2\text{M}^1\text{O}_3$, which is understood to contribute to structural stability, since an oxidation number of $\text{M}^1$ during charge is +4 and a $(\text{M}^1)^{4+/5+}$ redox potential is present in an oxygen band, $\text{M}^1$ does not substantially contribute to electrical conductivity. Also, lithium may occupy about 10% to about 20% of the metal layer or the metalloid layer due to the excess lithium and $\text{M}^1$ may be present in an amount of two or more times greater than the amount of lithium in the metal layer or the metalloid layer. As a result, the electrical conductivity may be reduced and initial discharge capacity may be reduced.

Thus, the disclosed cathode active material may provide improved structural stability by including the third lithium metal oxide, which is incapable of substantially intercalating and deintercalating lithium in a charge and discharge voltage range of about 2.0 V to about 4.7 V vs. Li/Li$^+$. Also, since the third lithium metal oxide has improved electrical conductivity in comparison to the first lithium metal oxide, i.e., $\text{Li}_2\text{M}^1\text{O}_3$, rate capability, initial efficiency, and initial discharge capacity may be improved.

The cathode active material may be a solid solution including the lithium metal composite oxide and the third lithium metal oxide and/or a composite of the lithium metal composite oxide and the third lithium metal oxide.

For example, the cathode active material may be a composite of the lithium metal composite oxide and the third lithium metal oxide. Specifically, the cathode active material may be a nanocomposite of the lithium metal composite oxide and the third lithium metal oxide wherein a particle size of the lithium metal composite oxide and the third lithium metal oxide are each independently about 1 nanometers (nm) to about 1000 nm, or about 5 nm to about 500 nm.

The cathode active material, as the composite, may further improve structural stability by including the third lithium metal oxide incapable of intercalating and deintercalating lithium in a charge and discharge voltage range of about 2.0 V to about 4.7 V vs. Li/Li$^+$.

The first lithium metal oxide and the third lithium metal oxide may each have the same crystal structure. Herein, the expression "the same crystal structure" denotes "the relative arrangement of the atoms in the crystalline solid", wherein the crystal structure may belong to a triclinic system, an orthorhombic system, a monoclinic system, or a rhombohedral system, for example.

Figure 1B:
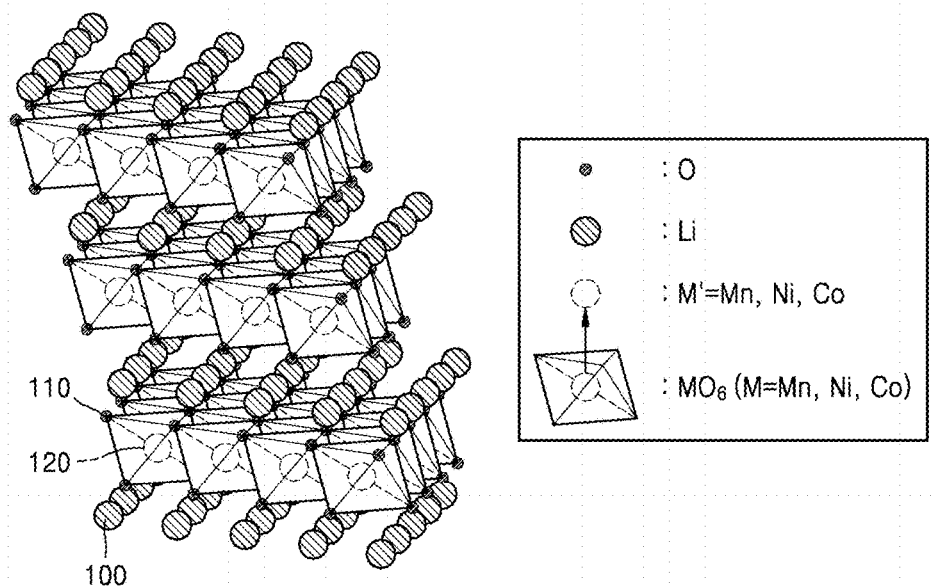
FIG. 1B is a schematic view illustrating a crystal structure of a second lithium metal oxide.
Figure 1C:
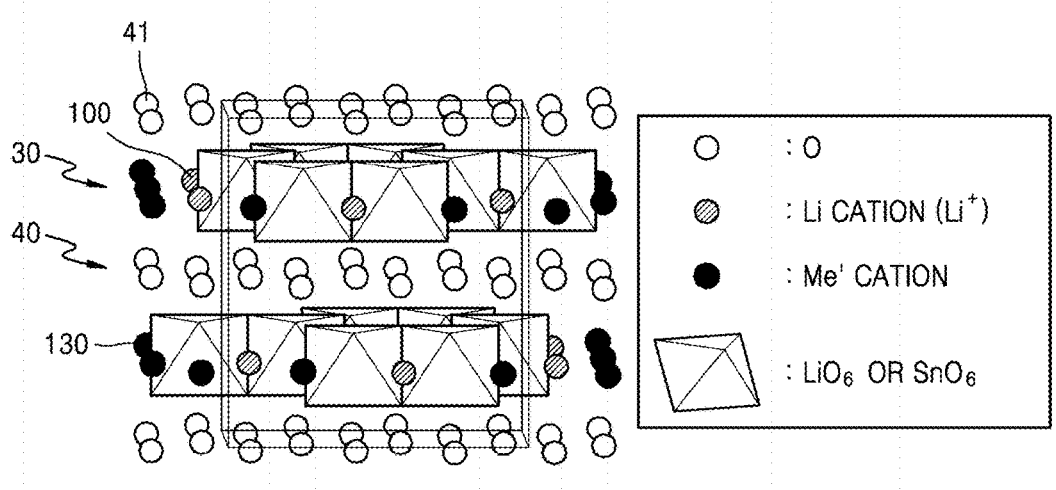
FIG. 1C is a schematic view illustrating a crystal structure of a third lithium metal oxide in the cathode active material according to the embodiment of the present disclosure.

FIG. 1A is a schematic view illustrating an embodiment of a crystal structure of the first lithium metal oxide, FIG. 1B is a schematic view illustrating an embodiment of a crystal structure of the second lithium metal oxide in the cathode active material, and FIG. 1C is a schematic view illustrating an embodiment of a crystal structure of the third lithium metal oxide in the cathode active material.

As illustrated in FIGS. 1A, 1B, and 1C, a crystal system the crystal structure of the first lithium metal oxide and the third lithium metal oxide may each be a monoclinic system. The monoclinic system denotes a crystal system in which lengths of three crystal axes, denoted a, b, and c, are different from one another and in which the a axis is perpendicular to b axis and c axis, and the b axis and c axis are not perpendicular to each other.

A space group of the first lithium metal oxide may be C2/m, and a space group of the third lithium metal oxide may be C2/c. That is, the first lithium metal oxide and the third lithium metal oxide exhibit very high symmetry.

In the first lithium metal oxide, an octahedral $\text{M}^1\text{O}_6$ layer 10 and a Li layer 20 are alternatingly arranged in a double layer and comprise Li 100, O 110, and $\text{M}^1$ 120 atoms. That is, the first lithium metal oxide is capable of intercalating and deintercalating lithium to and from the Li layer between the octahedral $\text{M}^1\text{O}_6$ layer and the octahedral $\text{M}^1\text{O}_6$ layer in a charge and discharge voltage range of about 2.0 V to about 4.7 V vs. Li/Li$^+$. In the third lithium metal oxide, an octahedral layer 30 comprising Li 100 and Me$^1$ atoms 130 (e.g., Sn$^{4+}$), in which LiO$_6$ and Me$^1$O$_6$ share edges, and an oxygen layer 40 comprising oxygen atoms 41 are alternatingly arranged to provide a double layer. That is, the third lithium metal oxide is incapable of intercalating and deintercalating lithium in a charge and discharge voltage range of about 2.0 V to about 4.7 V vs. Li/Li$^+$.

The cathode active material may be represented by Formula 1 below:

$$x\text{Li}_2\text{M}^1\text{O}_3 \cdot y\text{LiMe}^1\text{O}_2 \cdot z\text{Li}_2\text{M}'\text{O}_3 \qquad \text{Formula 1}$$

wherein, in in Formula 1, $0<x<1$, $0<y<1$, $0<z<1$, and $1<x+y+z\leq1.15$, $\text{M}^1$, $\text{Me}^1$, and M' may each independently be at least one ion selected from Group 2 to Group 14 elements, and $\text{M}^1$ and M' may be ions of different elements.

$\text{M}^1$ and Me in Formula 1 may each independently be at least one ion selected from manganese (Mn), vanadium (V), chromium (Cr), iron (Fe), cobalt (Co), nickel (Ni), zirconium (Zr), rhenium (Re), aluminum (Al), boron (B), magnesium (Mg), gallium (Ga), germanium (Ge), niobium (Nb), zinc (Zn), cadmium (Cd), titanium (Ti), calcium (Ca), silicon (Si), copper (Cu), tin (Sn), strontium (Sr), scandium (Sc), and yttrium (Y). $\text{M}^1$ and Me$^1$ may provide a layered lithium metal composite oxide.

M' in Formula 1 may be at least one ion selected from Sn, molybdenum (Mo), and ruthenium (Ru). M' does not form the lithium metal composite oxide and may obtain the third lithium metal oxide in which the crystal structure thereof is the same as that of the first lithium metal oxide but being incapable of intercalating and deintercalating lithium in a charge and discharge voltage range of about 2.0 V to about 4.7 V (vs. Li/Li$^+$).

In Formula 1, x may satisfy $0.2<x\leq0.75$ and y may satisfy $0.35<y\leq0.8$. When x and y are within the above ranges, a cathode active material which includes a lithium metal composite oxide having high capacity, in which excess lithium is substituted in the metal layer or the metalloid layer, may be obtained.

In Formula 1, z may satisfy $0<z\leq0.1$. For example, in Formula 1, z may satisfy $0.005\leq z\leq0.05$, and for example, z may satisfy $0.005\leq z\leq0.025$. When z is within the above range, rate capability, initial efficiency, and initial discharge capacity may be significantly improved without reducing the discharge capacity of the cathode active material.

According to another aspect of the present disclosure, a cathode including the cathode active material is provided.

According to another aspect of the present disclosure, provided is a lithium battery which includes the cathode, an anode including an anode active material, and an electrolyte disposed between the cathode and the anode. The lithium battery, for example, may be prepared as follows:

First, the cathode may be prepared as follows:

A cathode active material composition is prepared by mixing a cathode active material, which includes a layered lithium metal composite oxide that is composed of a first lithium metal oxide and a second lithium metal oxide having different crystal structures, and a third lithium metal oxide incapable of intercalating and deintercalating lithium in a charge and discharge voltage range of about 2.0 V to about 4.7 V (vs. lithium $Li/Li^+$), a conductive agent, a binder, and a solvent. A cathode plate having a cathode active material layer formed thereon may be prepared by directly coating and drying the cathode active material composition on a current collector. Alternatively, the cathode active material composition is cast on a separate support and a cathode plate having a cathode active material layer formed thereon may then be prepared by laminating a film separated from the support on the current collector.

Since each crystal structure of the first lithium metal oxide and the third lithium metal oxide and the composition of the cathode active material are the same as described above, the further description thereof will be omitted below.

The cathode may further include a conductive agent. As the conductive agent, a high specific surface area carbon material such as carbon black, graphite fine particles, natural graphite, artificial graphite, acetylene black, Ketjen black, carbon fibers, and carbon nanotubes; metal powders such as copper, nickel, aluminum, and silver, or metal fibers, or metal tubes; conductive polymers, such as a polyphenylene derivative, may be used. Also, conductive fibers, such as fibers prepared by carbonization of vapor-grown carbon and pitch (e.g., a byproduct of petroleum, coal, or coal tar) at high temperature or carbon fibers prepared from polyacrylonitrile, may be used as the conductive agent. Carbon fibers and the high specific surface area carbon material may be simultaneously used. When the carbon fibers and the high specific surface area carbon material are simultaneously used, electrical conductivity may be further improved.

Examples of the binder may be a vinylidene fluoride/hexafluoropropylene copolymer, polyvinylidene fluoride, polyacrylonitrile, a polymer of a fluorine compound, polytetrafluoroethylene (PTFE), mixtures of the foregoing polymers, a styrene butadiene rubber-based polymer, or a carboxylic acid vinyl ester polymer. Examples of the fluorine compound may be fluorinated $C_1$-$C_{18}$ alkyl (meth)acrylate, perfluoroalkyl (meth)acrylate (e.g., perfluorododecyl (meth)acrylate, perfluoro n-octyl (meth)acrylate, and perfluoro n-butyl (meth)acrylate), perfluoroalkyl substituted alkyl (meth)acrylate (e.g., perfluorohexylethyl (meth)acrylate and perfluorooctylethyl (meth)acrylate), perfluorooxyalkyl (meth)acrylate (e.g., perfluorododecyloxyethyl (meth)acrylate and perfluorodecyloxyethyl (meth)acrylate), fluorinated $C_1$-$C_{18}$ alkyl crotonate, fluorinated $C_1$-$C_{18}$ alkyl malate, fluorinated $C_1$-$C_{18}$ alkyl malate and fumarate, fluorinated $C_1$-$C_{18}$ alkyl itaconate, and fluorinated alkyl substituted olefin (about 2 to about 10 of carbon atoms, and about 1 to about 17 of fluorine atoms) (e.g., perfluorohexyl ethylene, fluorinated olefins having about 2 to 10 of carbon atoms and about 1 to 20 of fluorine atoms, in which a fluorine atom is bonded to a double-bonded carbon, tetrafluoroethylene, trifluoroethylene, vinylidene fluoride, and hexafluoropropylene).

Examples of the binder may be a polysaccharide and a derivatives thereof such as starch, methyl cellulose, carboxymethyl cellulose, hydroxymethyl cellulose, hydroxyethyl cellulose, hydroxypropyl cellulose, carboxymethyl hydroxyethyl cellulose, and nitrocellulose; a phenol resin; a melamine resin; a polyurethane resin, an urea resin; a polyamide resin; a polyimide resin; a polyamide-imide resin; a petroleum pitch; or a coal pitch. A plurality of binders may be used as the binder. Also, the binder may function as a thickener in an electrode material mixture.

Examples of the solvent may be N-methylpyrrolidone (NMP), acetone, and water. However, the binder and the solvent are not necessarily limited thereto and any suitable binder and solvent may be used.

Examples of the current collector may be a metal, such as nickel, aluminum, titanium, copper, gold, silver, platinum, an aluminum alloy, and stainless steel; a material formed by plasma spraying or arc spraying a carbon material, activated carbon fibers, nickel, aluminum, zinc, copper, tin, lead, or an alloy thereof; and a conductive film in which a conductive agent is dispersed in a resin such as a rubber or a styrene-ethylene-butylene-styrene copolymer (SEBS). For example, aluminum, nickel, or stainless steel may be used as the current collector. In particular, aluminum may be used due to the fact that it is easily processed into a thin film and is inexpensive. The shape of the current collector is not particularly limited, and for example, any suitable shape including a thin film, flat plate, mesh, net, punched, or embossed shape, or a combination thereof (e.g., mesh-shaped flat plate) may be used. For example, irregularities may be formed on the surface of the current collector by etching.

Contents of the cathode active material, conductive agent, binder, and solvent are amounts typically used in a lithium battery. One or more of the conductive agent, binder, and solvent may be omitted according to applications and configurations of lithium batteries.

In addition to the above-described cathode active material, the cathode active material may further include an additional cathode active material. Any suitable cathode active material may be used as the additional cathode active material as long as it is suitable for use in a cathode and is capable of intercalating and deintercalating lithium.

The cathode active material capable of intercalating and deintercalating lithium is not particularly limited, but, as a specific example, a compound expressed as one of the following chemical formulas may be used: $Li_aA_{1-b}B'_bD'_2$ (where $0.90\leq a\leq1.8$, $0\leq b\leq0.5$); $Li_aE_{1-b}B'_bO_{2-c}D'_c$ (where $0.90\leq a\leq1.8$, $0\leq b\leq0.5$, $0\leq c\leq0.05$); $LiE_{2-b}B'_bO_{4-c}D'_c$ (where $0\leq b\leq0.5$, $0\leq c\leq0.05$); $Li_aNi_{1-b-c}Co_bB'_cD'_\alpha$ (where $0.90\leq a\leq1.8$, $0\leq b\leq0.5$, $0\leq c\leq0.05$, $0<\alpha\leq2$); $Li_aNi_{1-b-c}Co_bB'_cO_{2-\alpha}F_\alpha$ (where $0.90\leq a\leq1.8$, $0\leq b\leq0.5$, $0\leq c\leq0.05$, $0<\alpha<2$); $Li_aNi_{1-b-c}Co_bB'_cO_{2-\alpha}F_2$ (where $0.90\leq a\leq1.8$, $0\leq b\leq0.5$, $0\leq c\leq0.05$, $0<\alpha<2$); $Li_aNi_{1-b-c}Mn_bB'_cD'_\alpha$ (where $0.90\leq a\leq1.8$, $0\leq b\leq0.5$, $0\leq c\leq0.05$, $0<\alpha\leq2$); $Li_aNi_{1-b-c}Mn_b$ $B'_cO_{2-\alpha}F_\alpha$ (where $0.90 \leq a \leq 1.8$, $0 \leq b \leq 0.5$, $0 \leq c \leq 0.05$, $0 < \alpha < 2$); $Li_aNi_{1-b-c}Mn_bB'_cO_{2-\alpha}F_2$ (where $0.90 \leq a \leq 1.8$, $0 \leq b \leq 0.5$, $0 \leq c \leq 0.05$, $0 < \alpha < 2$); $Li_aNi_bE_cG_dO_2$ (where $0.90 \leq a \leq 1.8$, $0 \leq b \leq 0.9$, $0 \leq c \leq 0.5$, $0.001 \leq d \leq 0.1$); $Li_aNi_bCo_cMn_dG_eO_2$ (where $0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ (where $0.90 \leq a \leq 1.8$, $0.001 \leq b \leq 0.1$); $Li_aCoG_bO_2$ (where $0.90 \leq a \leq 1.8$, $0.001 \leq b \leq 0.1$); $Li_aMnG_bO_2$ (where $0.90 \leq a \leq 1.8$, $0.001 \leq b \leq 0.1$); $Li_aMnG_bO_4$ (where $0.90 \leq a \leq 1.8$, $0.001 \leq b \leq 0.1$); $LiQO_2$; $LiQS_2$; $LiV_2O_5$; $LiI'O_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the above chemical formulas, A may be at least one selected from Ni, Co, and Mn; B' may be at least one selected from Al, Ni, Co, Mn, Cr, Fe, Mg, Sr, V, and alkaline rare earth elements; D' may be at least one selected from oxygen (O), fluorine (F), sulfur (S), and phosphorus (P); E may be at least one selected from Co and Mn; G may be at least one selected from Al, Cr, Mn, Fe, Mg, lanthanum (La), cerium (Ce), Sr, and V; Q may be least one selected from Ti, Mo, and Mn; I' may be least one selected from Cr, V, Fe, Sc, and Y; and J may be least one selected from V, Cr, Mn, Co, Ni, and Cu.

The anode may be prepared in the same manner as the cathode except that an anode active material is used instead of the cathode active material.

For example, the anode may be prepared as follows:

As in the preparation of the cathode, an anode active material composition is prepared by mixing an anode active material, a conductive agent, a binder, and a solvent, and the anode active material composition is directly coated on a current collector to prepare an anode plate. Alternatively, the anode active material composition is cast on a separate support and an anode plate may then be prepared by laminating anode active material films separated from the support on the current collector.

Lithium metal, a metallic material alloyable with lithium, a transition metal oxide, a material capable of doping and dedoping lithium, or a material capable of reversibly intercalating and deintercalating lithium may be used as the anode active material of a lithium battery.

Specific examples of the transition metal oxide may be vanadium oxide or lithium vanadium oxide, and examples of the material capable of doping and dedoping lithium may be Si, $SiO_x$ (wherein $0 < x < 2$), an Si—Y' alloy (wherein Y' is alkaline metal, alkaline earth metal, Group 13 to Group 16 element, a transition metal, a rare earth element, or a combination, and is not Si), Sn, $SnO_2$, and an Sn—Y' alloy (wherein Y' is alkaline metal, alkaline earth metal, a Group 13 to Group 16 element, a transition metal, a rare earth element, or a combination thereof, and is not Sn), or at least one thereof and $SiO_2$ may be mixed to be used as the material capable of doping and dedoping lithium. Examples of the element Y' may be Mg, Ca, Sr, barium (Ba), radium (Ra), Sc, Y, Ti, Zr, hafnium (Hf), rutherfordium (Rf), V, Nb, tantalum (Ta), dubnium (Db), Cr, Mo, tungsten (W), seaborgium (Sg), technetium (Tc), rhenium (Re), bohrium (Bh), Fe, lead (Pb), Ru, osmium (Os), hassium (Hs), rhodium (Rh), iridium (Ir), palladium (Pd), platinum (Pt), Cu, silver (Ag), gold (Au), Zn, Cd, B, Al, Ga, Sn, indium (In), Ti, Ge, P, arsenic (As), antimony (Sb), bismuth (Bi), S, selenium (Se), tellurium (Te), polonium (Po), and a combination thereof.

The material capable of reversibly intercalating and deintercalating lithium and may be a carbonaceous material, wherein any suitable carbon-based anode active material may be used as long, and examples thereof may be crystalline carbon, amorphous carbon, or mixtures thereof.

Examples of the crystalline carbon may be graphite such as shapeless, plate, flake, spherical, or fibrous natural graphite or artificial graphite, and examples of the amorphous carbon may be soft carbon (low-temperature calcined carbon) or hard carbon, mesophase pitch carbide, and fired coke.

However, the anode active material is not limited thereto and any suitable anode active material may be used as long as it is capable of reversibly intercalating and deintercalating lithium.

Also, pores in an electrode plate may be formed by further adding a plasticizer to the cathode active material composition and the anode active material composition.

Contents of the anode active material, conductive agent, binder, and solvent are amounts used in a lithium battery and may be determined by one of skill in the art without undue experimentation. One or more of the conductive agent, binder, and solvent may be omitted if desired.

Next, a separator, which will be interposed between the cathode and the anode, is prepared. Any suitable separator may be used. A separator having high electrolyte-retention ability as well as low resistance to the transfer of electrolyte ions may be used. Examples of the separator may be one selected from glass fibers, polyester, Teflon, polyethylene, polypropylene, polytetrafluoroethylene (PTFE), and combinations thereof. The separator may be a nonwoven or woven fabric type. For example, the separator may be prepared according to the following method.

A separator composition is prepared by mixing a polymer resin, a filler, and a solvent. The separator composition may be directly coated on an electrode and dried to prepare a separator. Also, the separator composition may be cast and dried on a support, and a separator may then be prepared by laminating separator films separated from the support on an electrode.

A polymer resin used in the preparation of the separator is not particularly limited and any suitable material used in a binder for an electrode plate may be used. Examples of the polymer resin may be vinylidene fluoride/hexafluoropropylene copolymer, polyvinylidene fluoride (PVDF), polyacrylonitrile, poly(methyl methacrylate), and mixtures thereof.

Next, an electrolyte is prepared.

For example, the electrolyte in a lithium battery may be an organic electrolyte. Also, the electrolyte in a lithium battery may be a solid. For example, the electrolyte may be a boron oxide, or a lithium oxynitride. However, the electrolyte is not limited thereto and any suitable electrolyte may be used. The solid electrolyte may be formed on the anode using a method such as sputtering.

For example, an organic electrolyte may be prepared. The organic electrolyte may be prepared by dissolving a lithium salt in an organic solvent.

Any suitable organic solvent may be used. An aprotic organic solvent may be used as the organic solvent, and examples of the organic solvent may be propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, 1,3-dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene, diethyleneglycol, dimethylether, and mixtures thereof.

Any suitable lithium salt may be used. Examples of the lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ wherein x and y are natural numbers, LiCl, LiI, and mixtures thereof. A concentration of the lithium salt, for example, may be in a range of about 0.01 molar (M) to about 3 M.

Figure 5:
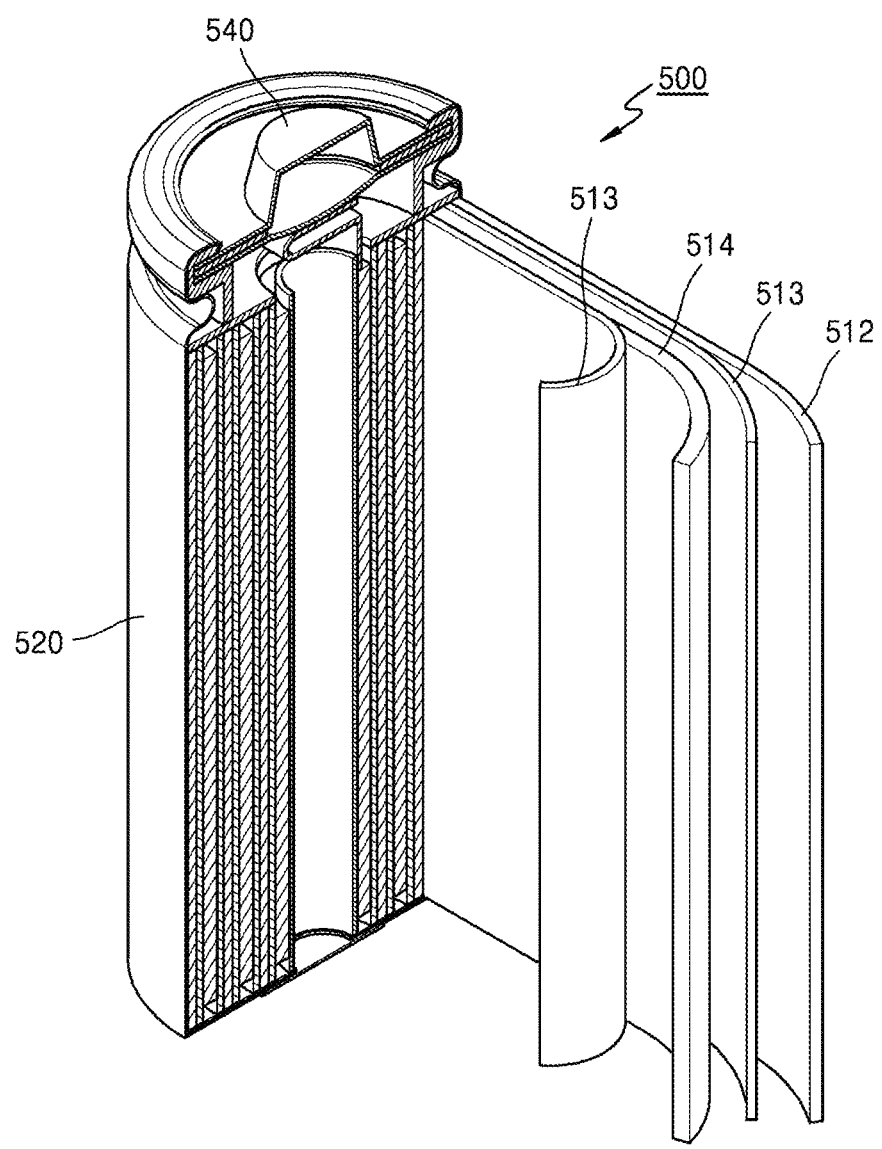
FIG. 5 is an exploded perspective view of an embodiment of a lithium battery.

FIG. 5 is an exploded perspective view of a lithium battery 100 according to an embodiment of the present disclosure.

As shown in FIG. 5, the lithium battery 500 includes a cathode 514, a separator 513, and an anode 512. The cathode 514, separator 513, and anode 512 are wound and folded to be contained in a battery case 520. Subsequently, an organic electrolyte solution is disposed, e.g., injected, into the battery case 520 and the lithium battery 500 is completed by being sealed with a sealing member 540. The battery case 520 may be a cylindrical, rectangular, or thin-film type. For example, the lithium battery 500 may be a large thin-film type battery. The lithium battery 500, for example, may be a lithium-ion battery.

A separator is disposed between the cathode and the anode such that a battery structure may be formed. The battery structure may be stacked to provide a bi-cell structure, and then impregnated in an organic electrolyte solution. A lithium-ion polymer battery is completed when a product thus obtained is contained in a pouch and sealed.

Also, a plurality of battery structures may be stacked to form a battery pack, and the battery pack may be used in a device to provide high capacity and high power. For example, the battery pack may be used in a notebook, smartphone, power tool, or an electric vehicle (EV).

Furthermore, because the lithium battery has excellent storage stability at high temperature, life characteristics, and rate capability, it may be suitable for use in an EV. For example, the lithium battery may be used in a hybrid vehicle such as a plug-in hybrid electric vehicle (PHEV).

According to another aspect of the present disclosure, provided is a method of preparing a cathode active material including: adding a base to a first lithium metal oxide precursor and a second lithium metal oxide precursor having different crystal structures to form a first mixture; and drying the first mixture to obtain a precursor of a layered lithium metal composite oxide; adding a lithium source and a third lithium metal oxide precursor to the precursor of the lithium metal composite oxide to form a second mixture; and heat treating the second mixture to prepare the cathode active material.

First, the first lithium metal oxide precursor and the second lithium metal oxide precursor are prepared.

The first lithium metal oxide precursor and the second lithium metal precursor may each independently include a salt of at least one metal or metalloid selected from Mn, V, Cr, Fe, Co, Ni, Zr, Re, Al, B, Mg, Ga, Ge, Nb, Zn, Cd, Ti, Ca, Si, Cu, Sn, Sr, Sc, and Y, or a hydrate thereof. Examples of the salt of a metal or metalloid may be one selected from a sulfate, a nitrate, an acetate, and a halide of the metal or metalloid, and a combination thereof. However, the salt of a metal or metalloid is not limited thereto, and any suitable salt of a metal or metalloid may be used.

A base is added to the salt of a metal or metalloid or the hydrate and dried to obtain a precursor of the layered lithium metal composite oxide. The base may include one selected from $Na_2CO_3$, NaOH, KOH, $NH_4OH$, and a combination thereof.

A concentration of the base may be adjusted to obtain the precursor of a layered lithium metal composite oxide as a precipitate at a pH value of about 8 to about 10, for example, about 8 to about 9. When the concentration of the base is adjusted within the pH range, a high-density precursor of a layer-structured lithium metal composite oxide may be obtained. The precursor of a lithium metal composite oxide, for example, may be at least one hydroxide selected from Mn, V, Cr, Fe, Co, Ni, Zr, Re, Al, B, Mg, Ga, Ge, Nb, Zn, Cd, Ti, Ca, Si, Cu, Sn, Sr, Sc, and Y.

Next, the cathode active material is prepared by adding a lithium source and a third lithium metal oxide precursor to the lithium metal composite oxide precursor to form a second mixture and the second mixture heat treated to prepare the cathode active material. The lithium source may be a lithium salt and, for example, may include one selected from $Li_2CO_3$, $LiNO_3$, LiBr, LiCl, LiI, LiOH, $Li(CH_3CO_2)$, $LiH_2PO_4$, $LiOH \cdot H_2O$, $Li(CH_3CO_2) \cdot 2H_2O$, and a combination thereof. The third lithium metal oxide precursor may be at least one selected from $SnO_2$, $SnC_2O_4$, $MoO_2$, and $RuO_2$, and, for example, may be $SnO_2$ or $SnC_2O_4$.

An amount of the third lithium metal oxide precursor may be about 0.1 mole (mol) or less, based on 1 mol of the precursor of the layer-structured lithium metal composite oxide, for example, may be in a range of about 0.005 mol to about 0.05 mol, based on 1 mol of the precursor of the layer-structured lithium metal composite oxide, and for example, may be in a range of about 0.005 mol to about 0.025 mol based on 1 mol of the precursor of the layer-structured lithium metal composite oxide. When the amount of the third lithium metal oxide precursor included is within the above range, rate capability, initial efficiency, and initial discharge capacity may be significantly improved without reducing the discharge capacity of the final cathode active material.

The heat treatment in the preparing of the cathode active material may be performed in a temperature range of about 800° C. to about 1,200° C. under an air or oxygen atmosphere and, for example, may be performed in a temperature range of about 850° C. to 1,000° C. under an air or oxygen atmosphere. A composite of the lithium metal composite oxide and the third lithium metal oxide may be formed by the heat treatment.

Alternatively, the amount of the third lithium metal oxide may be added in the obtaining of the precursor of the layer-structured lithium metal composite oxide. Thereafter, the above-described lithium source is added to the obtained precursor of the lithium metal composite oxide and heat treated to prepare a cathode active material.

Hereinafter, the present disclosure will be described in further detail, according to specific examples. However, the following examples are merely presented to exemplify the present disclosure, and the scope of the present disclosure is not limited thereto.

Also, since any details not described herein may be technically easily inferred by those skilled in the art, descriptions thereof will not be provided. 0

EXAMPLES

Preparation of Cathode Active Material

Example 1: Preparation of Cathode Active Material

A nickel sulfate aqueous solution ($NiSO_4 \cdot 6(H_2O)$, available from Aldrich) having a concentration of about 2 molar (M), a cobalt sulfate aqueous solution ($CoSO_4 \cdot 7(H_2O)$, available from Aldrich) having a concentration of about 2 M, and a manganese sulfate aqueous solution ($MnSO_4 \cdot x(H_2O)$, available from Aldrich) having a concentration of about 2 M were respectively prepared as a first lithium metal oxide precursor and a second lithium metal oxide precursor. Thereafter, a mixed solution was prepared by mixing the nickel sulfate aqueous solution, the cobalt sulfate aqueous solution, and the manganese sulfate aqueous solution to obtain a molar ratio of nickel:cobalt:manganese of about 0.16:0.08:0.76.

About 35 milliliters (mL) of a 30% $NH_4OH$ aqueous solution was added to about 1 liter (L) of the mixed solution and stirred for about 30 minutes or more. Then, a reaction was performed for about 4 hours while maintaining a pH value of about 10 by adding about 400 mL of about 2 M of a $NH_4OH$ solution, and dried and then a layered lithium metal composite oxide precursor precipitate of the formula $Ni_{0.16}Co_{0.08}Mn_{0.76}(OH)_2$ was recovered by filtration.

The lithium metal composite oxide precursor precipitate of $Ni_{0.16}Co_{0.08}Mn_{0.76}(OH)_2$ was washed with water and dried. $Li_2CO_3$ (available from Aldrich) as a lithium source and $SnO_2$ (available from Aldrich) as a third lithium metal oxide precursor were mixed at a molar ratio of about 0.005, based on 1 mol of the lithium metal composite oxide precursor of $Ni_{0.16}Co_{0.08}Mn_{0.76}(OH)_2$ to obtain a molar ratio of Li:Ni:Co:Mn of about 1.6:0.16:0.08:0.76. The mixture was then put in an alumina crucible and heat treated at about 900° C. for about 6 hours under atmospheric pressure to prepare a cathode active material.

Example 2: Preparation of Cathode Active Material

A cathode active material was prepared in the same manner as in Example 1 except that $SnO_2$ (available from Aldrich) as the third lithium metal oxide precursor was mixed at a molar ratio of about 0.01 based on 1 mol of the lithium metal composite oxide precursor of $Ni_{0.16}Co_{0.08}Mn_{0.76}(OH)_2$ instead of mixing $SnO_2$ (available from Aldrich) as the third lithium metal oxide precursor at a molar ratio of about 0.005 based on 1 mol of the lithium metal composite oxide precursor of $Ni_{0.16}Co_{0.08}Mn_{0.76}(OH)_2$.

Example 3: Preparation of Cathode Active Material

A cathode active material was prepared in the same manner as in Example 1 except that $SnO_2$ (available from Aldrich) as the third lithium metal oxide precursor was mixed at a molar ratio of about 0.025 based on 1 mol of the lithium metal composite oxide precursor of $Ni_{0.16}Co_{0.08}Mn_{0.76}(OH)_2$ instead of mixing $SnO_2$ (available from Aldrich) as the third lithium metal oxide precursor at a molar ratio of about 0.005 based on 1 mol of the lithium metal composite oxide precursor of $Ni_{0.16}CO_{0.08}Mn_{0.76}(OH)_2$.

Example 4: Preparation of Cathode Active Material

A cathode active material was prepared in the same manner as in Example 1, except that $SnO_2$ (available from Aldrich) as the third lithium metal oxide precursor was mixed at a molar ratio of about 0.05 based on 1 mol of the lithium metal composite oxide precursor of $Ni_{0.16}Co_{0.08}Mn_{0.76}(OH)_2$ instead of mixing $SnO_2$ (available from Aldrich) as the third lithium metal oxide precursor at a molar ratio of about 0.005 based on 1 mol of the lithium metal composite oxide precursor of $Ni_{0.16}CO_{0.08}Mn_{0.76}(OH)_2$.

Example 5: Preparation of Cathode Active Material

A cathode active material was prepared in the same manner as in Example 1 except that $SnO_2$ (available from Aldrich) as the third lithium metal oxide precursor was mixed at a molar ratio of about 0.1 based on 1 mol of the lithium metal composite oxide precursor of $Ni_{0.16}Co_{0.08}Mn_{0.76}(OH)_2$ instead of mixing $SnO_2$ (available from Aldrich) as the third lithium metal oxide precursor at a molar ratio of about 0.005 based on 1 mol of the lithium metal composite oxide precursor of $Ni_{0.16}Co_{0.08}Mn_{0.76}(OH)_2$.

Comparative Example 1

Preparation of Cathode Active Material

A nickel sulfate aqueous solution ($NiSO_4 \cdot 6(H_2O)$), available from Aldrich) having a concentration of about 2 M, a cobalt sulfate aqueous solution ($CoSO_4 \cdot 7(H_2O)$, available from Aldrich) having a concentration of about 2 M, and a manganese sulfate aqueous solution ($MnSO_4 \cdot x(H_2O)$, available from Aldrich) having a concentration of about 2 M were respectively prepared as a first lithium metal oxide precursor and a second lithium metal oxide precursor. Thereafter, a mixed solution was prepared by mixing the nickel sulfate aqueous solution, the cobalt sulfate aqueous solution, and the manganese sulfate aqueous solution to obtain a molar ratio of nickel:cobalt:manganese of about 0.16:0.08:0.76.

About 35 mL of a 30% $NH_4OH$ aqueous solution was added to about 1 L of the mixed solution and stirred for about 30 minutes or more. Then, a reaction was performed for about 4 hours while maintaining a pH value of about 10 by adding about 400 mL of about 2 M of a $NH_4OH$ solution, dried and then a layered lithium metal composite oxide precursor precipitate of $Ni_{0.16}Co_{0.08}Mn_{0.76}(OH)_2$ was filtered.

The lithium metal composite oxide precursor precipitate of $Ni_{0.16}Co_{0.08}Mn_{0.76}(OH)_2$ was washed with water and dried. $Li_2CO_3$ (available from Aldrich) as a lithium source was mixed to obtain a molar ratio of Li:Ni:Co:Mn of about 1.6:0.16:0.08:0.76. The mixture was then put in an alumina crucible and heat treated at about 900° C. for about 6 hours under atmospheric pressure to prepare a lithium metal composite oxide cathode active material.

Reference Example 1

Preparation of Cathode Active Material $Li_2CO_3$ (available from Aldrich) and $SnO_2$ (available from Aldrich) were mixed to obtain a molar ratio of Li:Sn:O of about 2:1:3. Then, the mixture was put in an alumina crucible and heat treated at about 900° C. for about 10 hours under atmospheric pressure to prepare a $Li_2SnO_3$ cathode active material.

Compositions of the cathode active materials of Examples 1 to 5, Comparative Example 1, and Reference Example 1 are summarized and presented in Table 1 below.

TABLE 1

| Example | Cathode active material composition |
|---|---|
| Example 1 | $0.6Li_2MnO_3 \cdot 0.4LiNi_{0.4}Co_{0.02}Mn_{0.4}O_2 \cdot 0.005Li_2SnO_3$ |
| Example 2 | $0.6Li_2MnO_3 \cdot 0.4LiNi_{0.4}Co_{0.02}Mn_{0.4}O_2 \cdot 0.01Li_2SnO_3$ |
| Example 3 | $0.6Li_2MnO_3 \cdot 0.4LiNi_{0.4}Co_{0.02}Mn_{0.4}O_2 \cdot 0.025Li_2SnO_3$ |
| Example 4 | $0.6Li_2MnO_3 \cdot 0.4LiNi_{0.4}Co_{0.02}Mn_{0.4}O_2 \cdot 0.05Li_2SnO_3$ |
| Example 5 | $0.6Li_2MnO_3 \cdot 0.4LiNi_{0.4}Co_{0.02}Mn_{0.4}O_2 \cdot 0.1Li_2SnO_3$ |
| Comparative Example 1 | $0.6Li_2MnO_3 \cdot 0.4LiNi_{0.4}Co_{0.02}Mn_{0.4}O_2$ |
| Reference Example 1 | $Li_2SnO_3$ |

Preparation of Lithium Battery

Example 6: Preparation of Lithium Half-Cell

The cathode active material powder according to Example 1 and a carbon conductive agent (Super P) were uniformly mixed, and a slurry was then prepared to obtain a weight ratio of cathode active material:carbon conductive agent:binder of about 90:6:4 by adding a pyrrolidone solution including about 5 wt % of a polyvinylidene fluoride (PVDF) binder (SOLEF 6020) to the mixture.

A 15 micrometer (μm) thick aluminum foil was bar-coated thereon with the slurry to a thickness of about 100 μm to about 120 μm and dried. Then, drying was further performed at about 120° C. in vacuum to prepare a cathode plate. The cathode plate was rolled with a roll press to prepare a cathode for a coin cell in the form of a sheet. In this case, a capacity of the cathode was about 2.3 milliampere-hours per square centimeter (mAh/cm$^2$).

A coin-type lithium half-cell (CR2032 type) having a diameter of about 12 millimeters (mm) was prepared by using the cathode.

Metallic lithium was used as a counter electrode during the preparation of the half-cell, and a lithium salt, in which about 1.1 M LiPF$_6$ and about 0.2 M LiBF$_4$ were dissolved in a solvent mixture of ethylene carbonate (EC):diethyl carbonate (DEC):fluoroethylene carbonate (FEC) (volume ratio of about 2:6:2), was used as an electrolyte.

Examples 7 to 10

Preparation of Lithium Half-Cells

Coin-type lithium half-cells (CR2032 type) were prepared in the same manner as in Example 6 except that the cathode active material powders according to Examples 2 to 5 were respectively used instead of the cathode active material powder according to Example 1.

Comparative Example 2

Preparation of Lithium Half-Cell

A coin-type lithium half-cell (CR2032 type) was prepared in the same manner as in Example 6 except that the cathode active material powder according to Comparative Example 1 was used instead of the cathode active material powder according to Example 1.

Analysis Example 1

X-Ray Diffraction (XRD) Analysis

The cathode active materials according to Examples 1 to 5, Comparative Example 1, and Reference Example 1 were analyzed by XRD experiments. XRD patterns were measured using Cu-Kα radiation. The results thereof are presented in FIGS. 2A and 2B.

Figure 2A:
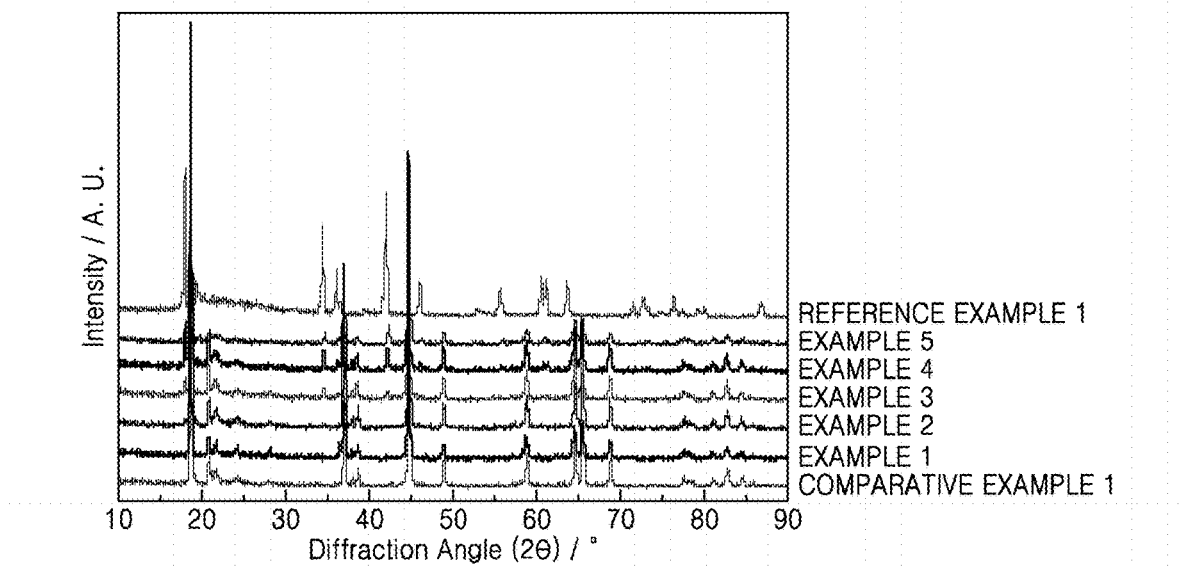
FIG. 2A is a graph of intensity (arbitrary units, a.u.) versus diffraction angle ($2\theta$) and illustrates the results of X-ray diffraction (XRD) analysis of cathode active materials according to Examples 1 to 5, Comparative Example 1, and Reference Example 1.
Figure 2B:
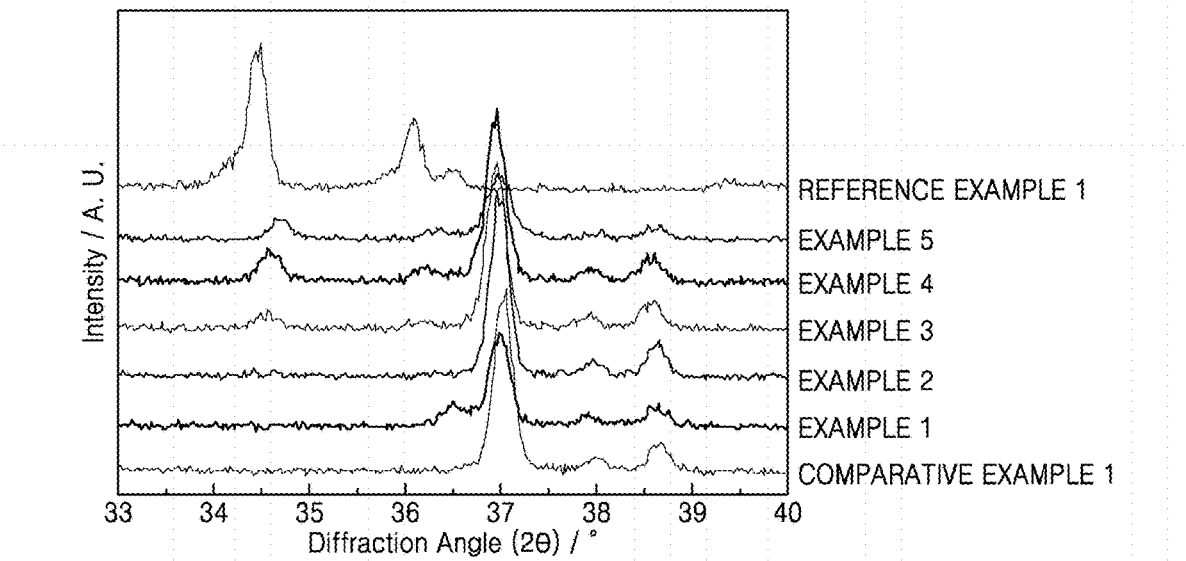
FIG. 2B is a graph of intensity (arbitrary units, a.u.) versus diffraction angle ($2\theta$) and illustrates XRD peaks of FIG. 2A in a Bragg angle ($2\theta$) range of about 33° to about 40°.

Referring to FIGS. 2A and 2B, the cathode active materials according to Examples 3 to 5 and Reference Example 1 exhibited (200) peaks at a Bragg angle (2θ) range of about 34° to about 35°, and the intensity of the (200) peak was increased as an amount of the third lithium metal oxide Li$_2$SnO$_3$ was gradually increased.

Also, the cathode active materials according to Examples 1 to 5, in which the amount of the third lithium metal oxide Li$_2$SnO$_3$ was gradually increased, exhibited (201) peaks at a Bragg angle (2θ) of about 37°, and it was observed that although the intensities of the (201) peaks were maintained, the (201) peaks of the cathode active materials according to Examples 1 to 5 were shifted to the left based on a peak of the cathode active material according to Comparative Example 1. Thus, it may be confirmed that the cathode active materials according to Examples 1 to 5 formed composites in which 0.6Li$_2$MnO$_3$·0.4 LiNi$_{0.4}$Co$_{0.02}$Mn$_{0.4}$O$_2$ composed of the first lithium metal oxide and the second lithium metal oxide, and Li$_2$SnO$_3$ were composited.

Analysis Example 2

SEM (Scanning Electron Microscope) Images and Electron Probe Micro-Analyzer (EPMA) Analysis Scanning electron microscope (SEM) images of the cathode active materials according to Example 2, Example 4, and Comparative Example 1 were obtained at a magnification of about 1,900 times, about 3,300 times, and about 2,000 times, and the cathode active materials were analyzed using an electron probe micro-analyzer (EPMA). The SEM used was JSM-7600F available from JEOL and the EPMA used was JXA 8530F available from JEOL. The results thereof are respectively presented in FIGS. 3A to 3L.

Figure 3A:
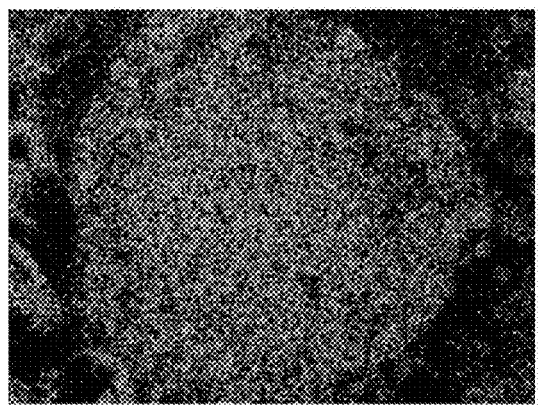
FIG. 3A to 3C, FIG. 3E to 3G, and FIGS. 3I to 3K illustrate cobalt (Co), tin (Sn), and nickel (Ni) distribution images of cathode active materials according to Example 2, Example 4, and Comparative Example 1, respective, as determined with an electron probe micro-analyzer (EPMA) at a magnification of about 1,900 times, about 3,300 times, and about 2,000 times, respectively.
Figure 3B:
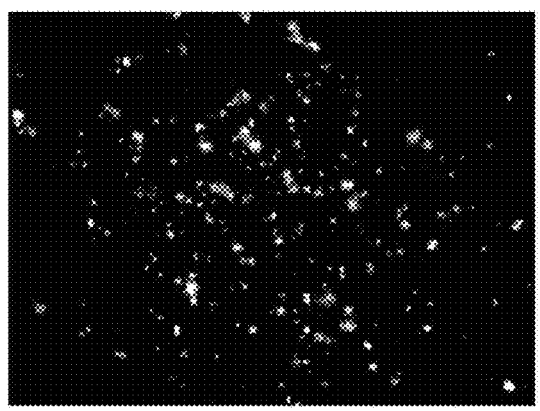
Figure 3C:
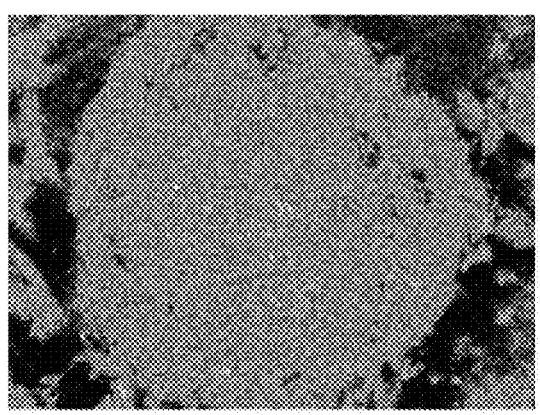
Figure 3D:
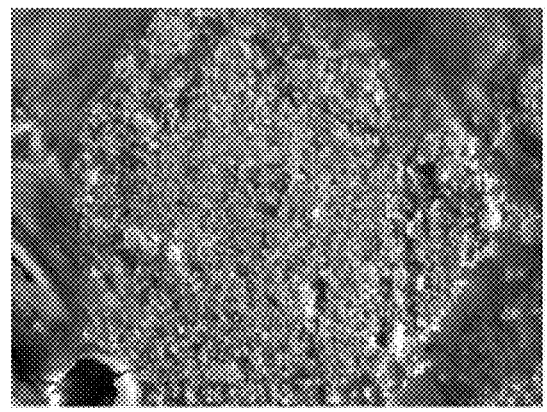
FIG. 3D, FIG. 3H, and FIG. 3L illustrate scanning electron microscope (SEM) images of the cathode active materials according to Example 2, Example 4, and Comparative Example 1 at a magnification of about 1,900 times, about 3,300 times, and about 2,000 times, respectively.
Figure 3E:
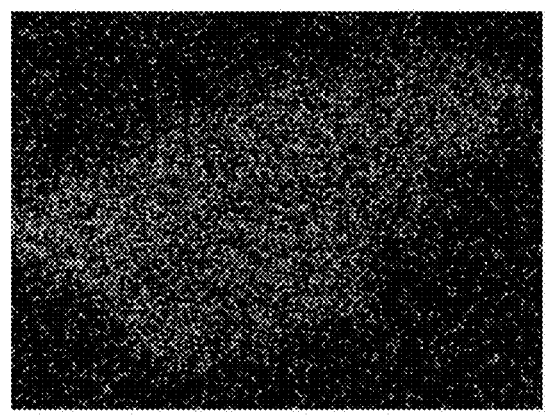
Figure 3F:
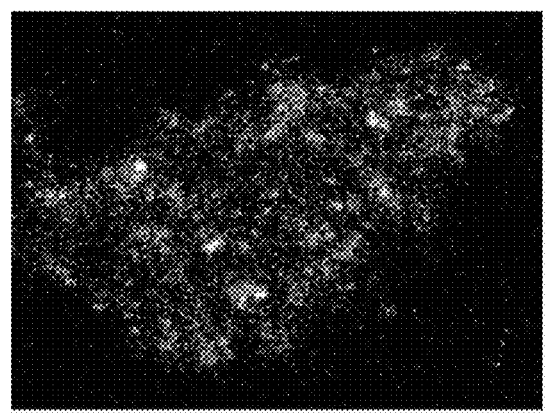
Figure 3G:
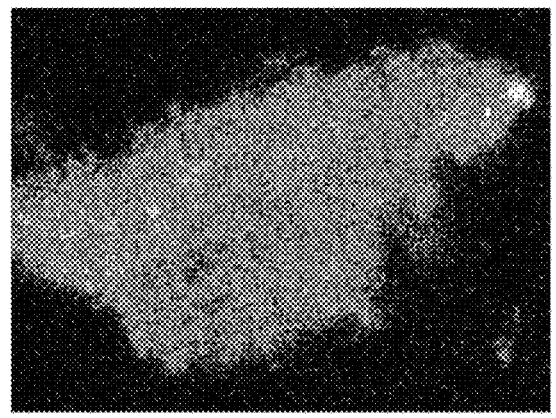

In the cathode active materials according to Examples 2 and 4 in FIGS. 3A to 3H, FIGS. 3A and 3E illustrate a Co distribution image by EPMA, FIGS. 3B and 3F illustrate a Sn distribution image by EPMA, FIGS. 3C and 3G illustrate an Ni distribution image by EPMA, and an SEM image, respectively.

Referring to FIGS. 3A to 3H, it may be confirmed that Sn distribution images were respectively observed in the cathode active materials according to Examples 2 and 4. Thus, it may be understood that the cathode active materials according to Examples 2 and 4 were composites in which Sn was uniformly distributed in 0.6Li$_2$MnO$_3$·0.4LiNi$_{0.4}$CO$_{0.02}$Mn$_{0.4}$O$_2$ particles.

Figure 3H:
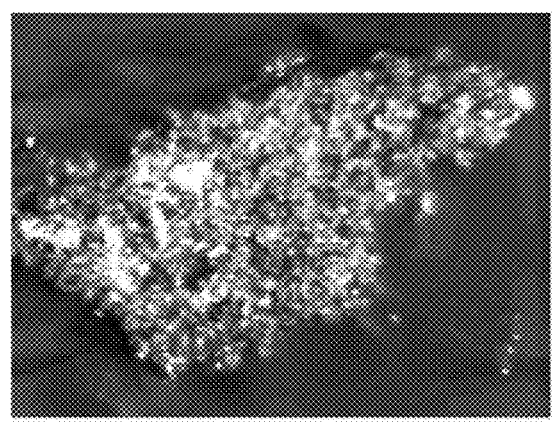
Figure 3I:
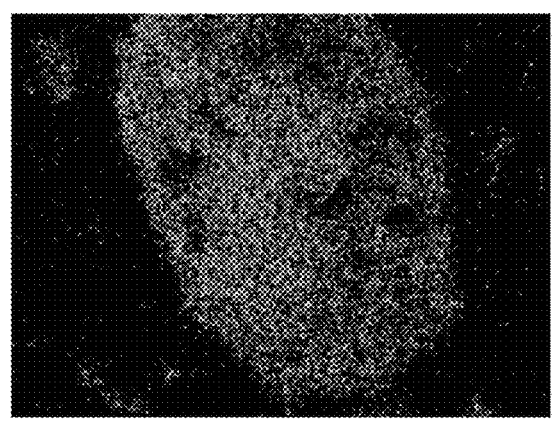
Figure 3J:
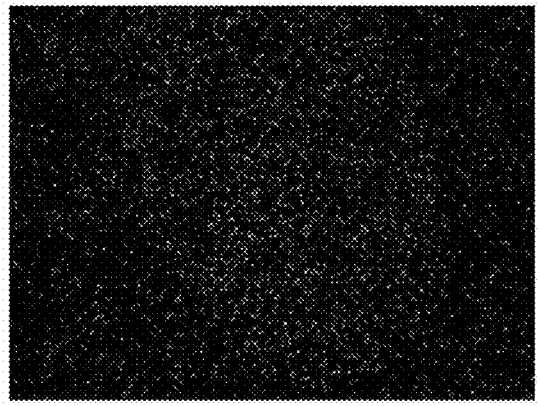
Figure 3K:
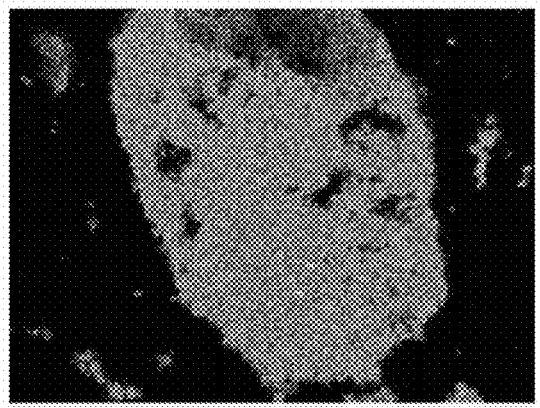
Figure 3L:
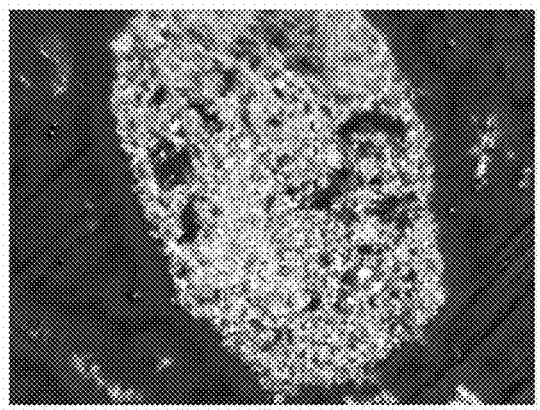

Whereas, referring to FIGS. 3I to 3L, in which 3I illustrates a Co distribution image by EPMA, 3J illustrates a Sn distribution image by EPMA, and 3K illustrates a Ni distribution image by EPMA, it may be confirmed that a Sn distribution image was not observed in the cathode active material according to Comparative Example 1. FIGS. 3D, 3H, and 3L are composite images of Example 2, Example 4, and Comparative Example 1, respectively.

Analysis Example 3

Inductively Coupled Plasma (ICP) Analysis

ICP analysis (ICP-AES, ICPS-8100, available from SHIMADZU) was performed on the cathode active materials according to Examples 1 to 5 and Comparative Example 1. The results thereof are presented in Table 2 below.

TABLE 2

| | ICP analysis value (mole fraction of each element present in cathode active materials) | | | | |
|---|---|---|---|---|---|
| Category | Li | Ni | Co | Mn | Sn |
| Example 1 | 1.63 | 0.147 | 0.079 | 0.774 | 0.49 |
| Example 2 | 1.60 | 0.147 | 0.079 | 0.774 | 0.97 |
| Example 3 | 1.62 | 0.146 | 0.079 | 0.775 | 2.53 |
| Example 4 | 1.65 | 0.146 | 0.079 | 0.775 | 4.81 |
| Example 5 | 2.04 | 0.147 | 0.079 | 0.774 | 8.44 |
| Comparative Example 1 | 1.59 | 0.149 | 0.080 | 0.771 | 0 |

Referring to Table 2, elements present in the cathode active materials according to Examples 1 to 5 and Comparative Example 1 and amounts thereof may be identified.

Referring to Table 2, compositions of the cathode active materials according to Examples 1 to 5 and Comparative Example 1 may be identified, and it may be confirmed that the amount of Li was also increased as the amount of a $Li_2SnO_3$ phase was increased.

about 1 C until the voltage reached about 2.5 V. Discharge capacities in this case were measured. The results thereof are presented in Table 3 below.

TABLE 3

| | 1st cycle | | | Rate capability (charge @ 0.5 C) | | | Charge @ 1 C |
|---|---|---|---|---|---|---|---|
| Category | 0.1 C charge (mAh/g) | 0.1 C discharge (mAh/g) | Initial efficiency (%) | 0.2 C (2.5 V) (mAh/g) | 2 C/ 0.2 C (%) | 3 C/ 0.33 C (%) | 1 C discharge (mAh/g) |
| Example 6 | 317 | 257 | 81.2 | 248 | 77.7 | 75.8 | 192 |
| Example 7 | 297 | 239 | 80.8 | 241 | 77.5 | 75.1 | 186 |
| Example 8 | 309 | 231 | 74.7 | 209 | 75.0 | 72.6 | 156 |
| Example 9 | 303 | 221 | 73.1 | 205 | 75.8 | 72.7 | 153 |
| Comparative Example 2 | 335 | 259 | 77.5 | 234 | 67.4 | 62.3 | 161 |

Evaluation Example 1

Electrical Conductivity Evaluation

Electrical conductivities were measured for the cathode active materials according to Examples 1 and 2, Comparative Example 1, and Reference Example 1 using a 4-point probe method. A device used in the measurement was Mitsubishi Chemical Analytech MCP-PD51. The results thereof are presented in FIG. 4.

Figure 4:
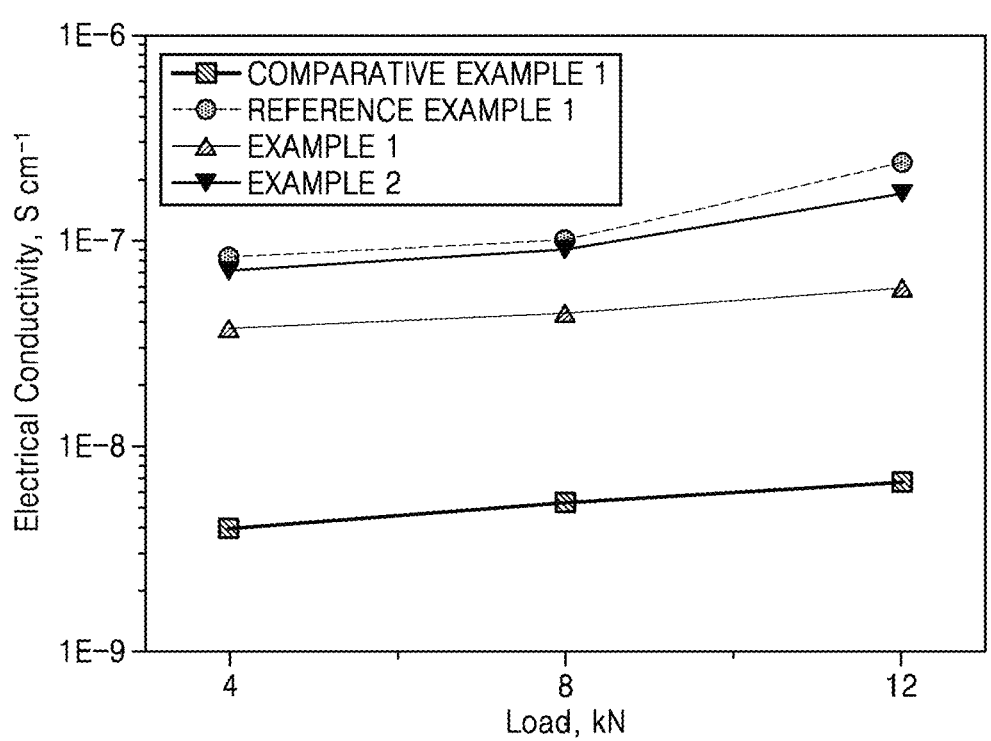
FIG. 4 is a graph of electrical conductivity (Siemens per centimeter, $S \cdot cm^{-1}$) illustrating the results of the evaluation of electrical conductivity of cathode active materials according to Examples 1 and 2, Comparative Example 1, and Reference Example 1.

Referring to FIG. 4, electrical conductivities of the cathode active materials according to Examples 1 and 2 were improved in comparison to that of the cathode active material according to Comparative Example 1. For example, the cathode active material according to Example 2 exhibited similar conductivity to the cathode active material according to Reference Example 1.

Evaluation Example 2

Charge and Discharge Characteristics Evaluation—Rate Capability, Initial Efficiency, and Initial Discharge Capacity The coin-type lithium half-cells according to Examples 6 to 9 and Comparative Example 2 were charged at about 0.1 C to a voltage of about 4.6 V at room temperature (about 25° C.). Then, the coin-type lithium half-cells were discharged at a 0.1 C constant current rate until the voltage reached a cut-off voltage of about 2.0 V. Charge capacities (charge capacities in a 1st cycle) and discharge capacities (discharge capacities in the 1st cycle) in this case were measured and initial discharge capacities and initial efficiencies (ratio of the discharge capacity at the 1st cycle to the charge capacity at the 1st cycle) were calculated from the measurements.

Next, the coin-type lithium half-cells were respectively charged at about 0.5 C according to the above-described charging method and were then respectively discharged at about 0.2 C, about 2 C, and about 3 C until the voltage reached about 2.5 V. Discharge capacities in this case were measured and rate capabilities (ratio of 2 C discharge capacity to 0.2 C discharge capacity and ratio of 3 C discharge capacity to 0.33 C discharge capacity) were calculated from the measurements.

Next, the coin-type lithium half-cells were respectively charged at about 1.0 C according to the above-described charging method and were then respectively discharged at Referring to Table 3, the initial efficiencies and 1 C discharge capacities of the coin-type lithium half-cells according to Examples 6 and 7 were improved in comparison to the initial efficiency and 1 C discharge capacity of the coin-type lithium half-cell according to Comparative Example 2. Also, the rate capabilities of the coin-type lithium half-cells according to Examples 6 to 9 were improved in comparison to the rate capability of the coin-type lithium half-cell according to Comparative Example 2.

As described above, according to the one or more of the above exemplary embodiments, a cathode active material according to an aspect of the present disclosure includes a layer-structured lithium metal composite oxide that is composed of a first lithium metal oxide and a second lithium metal oxide having different crystal structures, and a third lithium metal oxide incapable of intercalating and deintercalating lithium in a charge and discharge voltage range of about 2.0 V to about 4.7 V (vs. $Li/Li^+$). Thus, a cathode and a lithium battery including the cathode active material may have improved rate capability, initial efficiency, and initial discharge capacity.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:
1. A cathode active material comprising:
    a layered lithium metal composite oxide comprising
        a first lithium metal oxide and a second lithium metal oxide having different crystal structures; and
    a third lithium metal oxide which is incapable of intercalating and deintercalating lithium in a charge and discharge voltage range of about 2.0 volts to about 4.7 volts versus $Li/Li^+$,
    wherein the cathode active material is represented by Formula 1

  Formula 1 wherein the first lithium metal oxide is of the formula $Li_2M^1O_3$, the second lithium metal oxide is of the formula LiMe¹O₂, and wherein the third lithium metal oxide is of the formula Li₂M'O₃, wherein in Formula 1, 0<x<1, 0<y<1, 0<z<1, and 1<x+y+z≤1.15, M¹, M^{e1}, and M' are each independently at least one ion selected from group 2 to Group 14 elements, and M¹ and M' are different.

2. The cathode active material of claim 1, wherein the cathode active material is a composite of the layered lithium metal composite oxide and the third lithium metal oxide.

3. The cathode active material of claim 1, wherein the first lithium metal oxide and the third lithium metal oxide have a same crystal structure.

4. The cathode active material of claim 3, wherein a crystal system of the crystal structure of each of the first lithium metal oxide and the third lithium metal oxide is a monoclinic system.

5. The cathode active material of claim 1, wherein a space group of the first lithium metal oxide is C2/m and a space group of the third lithium metal oxide is C2/c.

6. The cathode active material of claim 1, wherein M¹ and Me¹ in Formula 1 are each independently at least one ion selected from manganese, vanadium, chromium, iron, cobalt, nickel, zirconium, rhenium, aluminum, boron, magnesium, gallium, germanium, niobium, zinc, cadmium, titanium, calcium, silicon, copper, tin, strontium, scandium, and yttrium.

7. The cathode active material of claim 1, wherein M' in Formula 1 is at least one ion selected from Sn, molybdenum, and ruthenium.

8. The cathode active material of claim 1, wherein, in Formula 1, 0.2<x≤0.75 and 0.35<y≤0.8.

9. The cathode active material of claim 1, wherein, in Formula 1, 0<z≤0.1.

10. The cathode active material of claim 1, wherein, in Formula 1, 0.005<z<0.05.

11. The cathode active material of claim 1, wherein, in Formula 1,
0.005≤z≤0.025.

12. A lithium battery comprising:
a cathode including the cathode active material of claim 1;
an anode including an anode active material; and
an electrolyte disposed between the cathode and the anode.

13. A method of preparing a cathode active material, the method comprising:
adding a base to a first lithium metal oxide precursor and a second lithium metal oxide precursor having different crystal structures to form a first mixture;
drying the first mixture to obtain a precursor of a layered lithium metal composite oxide;
adding a lithium source and a third lithium metal oxide precursor to the precursor of the layered lithium metal composite oxide to form a second mixture; and
heat treating the second mixture to prepare the cathode active material, wherein the layered lithium metal composite oxide comprises a first lithium metal oxide and a second lithium metal oxide having different crystal structures, wherein the cathode active material comprises a third lithium metal oxide which is incapable of intercalating and deintercalating lithium in a charge and discharge voltage range of about 2.0 volts to about 4.7 volts versus Li/Li⁺, wherein the cathode active material is represented by Formula 1

$x\text{Li}_2\text{M}^1\text{O}_3 \cdot y\text{LiMe}^1\text{O}_2 \cdot z\text{Li}_2\text{M}'\text{O}_3$     Formula 1 wherein the first lithium metal oxide is of the formula Li₂M¹O₃, the second lithium metal oxide is of the formula LiMe¹O₂, and wherein the third lithium metal oxide is of the formula Li₂M'O₃, wherein in Formula 1, 0<x<1, 0<y<1, 0<z<1, and 1<x+y+z≤1.15, M¹, Me¹, and M' are each independently at least one ion selected from group 2 to Group 14 elements, and M¹ and M' are different.

14. The method of claim 13, wherein the first lithium metal oxide precursor and the second lithium metal oxide precursor each independently comprise a salt of at least one metal or metalloid selected from manganese, vanadium, chromium, iron, cobalt, nickel, zirconium, rhenium, aluminum, boron, magnesium, gallium, germanium, niobium, zinc, cadmium, titanium, calcium, silicon, copper, tin, strontium, scandium, and yttrium, or a hydrate thereof.

15. The method of claim 13, wherein the third lithium metal oxide precursor is at least one selected from SnO₂, SnC₂O₄, MoO₂, and RuO₂.

16. The method of claim 13, wherein an amount of the third lithium metal oxide precursor is about 0.1 mole or less, based on 1 mole of the precursor of the layered lithium metal composite oxide.

17. The method of claim 13, wherein an amount of the third lithium metal oxide precursor is in a range of about 0.005 mol to about 0.05 mol based on 1 mol of the precursor of the layered lithium metal composite oxide.

18. The method of claim 13, wherein an amount of the third lithium metal oxide precursor is in a range of about 0.005 mole to about 0.025 mole, based on 1 mole of the precursor of the layered lithium metal composite oxide.

19. The method of claim 13, wherein the heat treating comprises heating in a temperature range of about 800° C. to about 1,200° C. under an air or oxygen atmosphere.

20. The cathode active material of claim 1, wherein Me' in Formula 1 is at least one ion selected from nickel, cobalt, and, manganese.

* * * * *